US005657463A

United States Patent [19]

Bingham

[11] Patent Number: 5,657,463

[45] Date of Patent: Aug. 12, 1997

[54] METHOD AND APPARATUS FOR POSITIONING A NEW WINDOW ON A DISPLAY SCREEN BASED ON AN ARRANGEMENT OF PREVIOUSLY-CREATED WINDOWS

[75] Inventor: Christopher R. Bingham, Sunnyvale, Calif.

[73] Assignee: Apple Computer, Inc., Cupertino, Calif.

[21] Appl. No.: 184,084

[22] Filed: Jan. 19, 1994

[51] Int. Cl.[6] .................... G06F 3/14

[52] U.S. Cl. .................... 395/342

[58] Field of Search .................... 395/157, 158, 395/342, 346, 343, 340; 345/119, 120

[56] References Cited

U.S. PATENT DOCUMENTS

| | | | |
|---|---|---|---|
| 4,769,762 | 9/1988 | Tsujido | 395/343 X |
| 5,060,170 | 10/1991 | Bourgeois et al. | 395/342 |
| 5,091,717 | 2/1992 | Carrie et al. | 345/119 |
| 5,101,365 | 3/1992 | Westberg et al. | 345/119 X |
| 5,121,478 | 6/1992 | Rao | 395/346 |
| 5,371,847 | 12/1994 | Hargrove | 395/342 |
| 5,377,317 | 12/1994 | Bates et al. | 395/342 |
| 5,390,295 | 2/1995 | Bates et al. | 395/342 |
| 5,459,825 | 10/1995 | Anderson et al. | 395/133 |
| 5,499,334 | 3/1996 | Staab | 395/340 |
| 5,577,187 | 11/1996 | Mariani | 395/342 |

*Primary Examiner*—Raymond J. Bayerl
*Assistant Examiner*—Crescelle N. dela Torre
*Attorney, Agent, or Firm*—Helene Plotka Workman

[57] ABSTRACT

A method and apparatus for positioning windows on a display screen in a computer environment in which a user perceives that multiple operations can be executed simultaneously. The method and apparatus for positioning windows is based upon the number of existing windows and the arrangement of previously-created windows. Preferably, a computer system incorporating the invention includes a one or more dam structures, herein called "window slots", each window slot retaining location information and indicating, either explicitly or implicitly, availability of the window slot. Window slots can be organized into a window slot structure. If a window is being opened, then a window slot is assigned to the window being opened and a window slot structure having zero or more window slots is updated. The assigning and updating is based upon the availability of a window slot and the number of in-use window slots in the window slot structure. Then the assigned window slot is associated with an identifier for the window being opened, and the window is opened on the display device.

28 Claims, 13 Drawing Sheets

METHOD AND APPARATUS FOR POSITIONING A NEW WINDOW ON A DISPLAY SCREEN BASED ON AN ARRANGEMENT OF PREVIOUSLY-CREATED WINDOWS

LIMITED COPYRIGHT WAVIER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

This invention relates generally to positioning windows on a display device in a computer system and, more specifically, to the displaying of a window on a display device at a location based upon an arrangement of previously-created windows.

BACKGROUND OF THE INVENTION

A window is an object which contains or presents information and which can be displayed upon a screen of a display device. A window may be visible or partially or totally obscured by one or more other windows. A window typically has two portions: a content region and a structure region. The content region is where information from an application program or a user is contained or presented. The structure region is the border region or frame of the window which may contain controls, i.e. buttons, scroll bars, or other mechanisms for issuing commands or for manipulating the window. Background information on windows can be found in "Apple Human Interface Guidelines", Windows can be opened or closed. In an environment which supports windows, a window is usually opened when a file is opened or created and the contents of the file are displayed in the content region of that window. In addition, a window is usually opened to display a message to a user when an action or process is being performed by the computer system. For example, a window can be used to display a status, error or other message indicating rite progress of the action or process. The window can also be used to display a request for input from the user in order to continue the action or process. When a window is closed, the associated file, if any, is also closed.

Typically, computer systems support multiple windows being open simultaneously. In multi-tasking or parallel-processing computer systems, typically windows are active as long as they are open, even if they are partially or totally obscured from view by other windows. In other systems, although multiple windows can be open, only one window can be active at any point in time. Usually, the active window is placed in the forefront so that it is not obscured by other windows. The active window is typically further differentiated from other windows by indicating its active status in the structure region.

When a window is opened, its positioning on a display screen is determined. The positioning of the window can be important to a user since multiple windows can be displayed at the same time and there is a finite amount of space on a display screen in which to display the windows.

In some cases, a user may have a preference as to where a particular window or type of window is positioned. For example, a user may prefer a particular position on the screen for status windows, while it may prefer a different specific position for a particular application program. Although prior window management systems permit a user or application to specify location information for windows associated with objects or processes, also called actions, operations or tasks, they do not permit a single process to simultaneously display multiple windows. In a system which permits multiple tasks to concurrently execute, if there are multiple tasks displaying windows simultaneously then the windows are displayed at random locations on the screen. By random, it is meant that the location of each of those windows is not based on any prior user preferences. This situation may occur, for example, when multiple operations such as searches for files on a system or copy operations are concurrently being performed. Each search or copy operation may have a separate window for displaying the status and/or results of that search or copy.

An example of such a system is the FINDER which is part of the Macintosh® computer's system software, commercially available from Apple Computer, Cupertino, Calif. For information on the FINDER see "Macintosh User's Guide for desktop Macintosh computers", particularly chapters 2, 4, 5, 6, 10 and 12, Apple Computer, Inc. 1992, the disclosure of which is herein incorporated by reference.

The FINDER is an application that manages a user's desktop interface. It is the program that creates the Macintosh desktop and keeps track of files. It displays icons representing an application and the documents created by an application and it tracks user activity on the desktop. When appropriate, the FINDER starts up an application and indicates which documents to open or print. The preferences folder is under the system folder and holds preferences files to record local configuration settings.

In the FINDER, versions 7.0 and 7.1, window positioning information is associated with objects such as folders. For descriptive purposes, "FINDER" refers to both versions 7.0 and 7.1. When an object is opened, the window in which the data for that object is displayed is positioned at the location on the screen associated with that object. Initially, this window positioning information is set to a default location on the screen such as the upper left of the screen. If a window already exists in the location specified for that object then the object's window is positioned slightly below and to the fight of the existing window. When an object's window is closed, the current position of the window is stored as the window positioning information associated with the object. Thus, if a window is moved between the time it is opened and closed, the new location is stored with the associated object and when the object is subsequently opened again, the window appears in the new location. Thus, a user's preference for window positioning as indicated by the location to which the window was moved, is stored and used later if the object is opened again.

In the FINDER, window positioning information is also associated with a process or operation. For example, when a user selects a DUPLICATE operation from the FILE menu, a status window is displayed detailing the progress of the DUPLICATE operation. The location of this window is derived from window positioning information associated with the DUPLICATE operation. This information is stored in the FINDER preferences file. This file contains window positioning information on an individual process basis for virtually all processes or operations provided to a user by the menu bar of the FINDER. Since the FINDER executes one process at a time and permits a single window per process, the FINDER can store in the preferences file only one location for each type of process.

If the window is moved while the process is running, then the new location is stored in the window positioning information associated with that process and the next time the process is invoked, the window will appear in the new location.

The FINDER is not designed for an environment in which a user perceives that multiple operations are executing simultaneously. The present invention is directed toward such an environment, providing several advantages.

SUMMARY OF THE INVENTION

Briefly, the invention is a method and apparatus for positioning windows on a display screen in a computer environment in which a user perceives that multiple operations can be executed simultaneously. According to the invention, the location on a display device of a window being opened depends upon the number of existing windows and the arrangement of previously-created windows. The invention is particularly useful in an environment where windows are not associated with specific objects such as folders, files or disks, although it can be used in such environments.

In general, a desktop management or file system incorporating the invention includes means for retaining location information and means for indicating availability of the retaining means. In a preferred embodiment, the means for retaining location information and the means for indicating availability are embodied in one or more data structures, each herein referred to as a "window slot", which at the least specifies directly or indirectly a location on a display device, e.g. screen, and explicitly or implicitly indicates whether the data structure is in-use or available. Window slots are logically grouped and referenced using one or more window slot structures. In systems where window slots explicitly indicate availability, one window slot structure is preferably used. However, in other systems two or more window slot' structures can be used to implicitly indicate availability. For example, the system can include one window slot structure for window slots which are in-use and another window slot structure for window slots which are available, i.e. not in-use.

The system further includes means for assigning a window to a window slot and means for accessing a window slot to retrieve the location information specified by the window slot. A window slot is considered available, or in other words not in-use, when it is not currently assigned to any particular window.

In a preferred embodiment where a single window slot structure is used, when a window is opened, it is assigned an available window slot, if any exists, and the window is displayed at the location specified in the window slot. If there are no available window slots, a new window slot is created and assigned to the window. The window is displayed at a location which is determined based on the arrangement of previously-created windows.

When a window is closed, its current location is stored in the window slot assigned to that window such that when the window slot is subsequently assigned to another window, it will be displayed in the same location. If the window slot includes means for indicating its availability, then it is updated to specify that the window slot is available. By storing the window's location when it is closed the invention retains information about a user's or application's preference for window locations. For example, a user may move a window to a particular location to more easily view another window. Additionally, a user may prefer to have windows appear in a particular area of the screen in order to work more efficiently. The invention retains this information about user preferences for window locations and permits subsequently created or opened windows to be displayed according to these preferences.

In an alternative embodiment where available and unavailable window slots are grouped separately, when a window is opened, an available window slot, if any exists, is assigned to fie window as previously described. The window slot is removed from the available group and added to the group of unavailable window slots. If there are no available window slots, then a new window slot is created, assigned to the window and added to the group of unavailable window slots. When a window is closed, its corresponding window slot is removed from the group of unavailable window slots and added to the group of available window slots.

Since the location at which to display a window being opened is determined by the location of a previously existing window or by the arrangement of existing windows, the invention retains information about user preferences for locations of windows. Thus, the invention displays windows in locations which are likely to be desirable by a user.

In addition, the invention provides for an arbitrary number of simultaneous process windows in a manner that is simple and effective for the user. It provides a method for memorizing window positions for windows that are not associated with more permanent or persistent objects such as disks, folders, files.

The invention is particularly useful in an environment where a user perceives that multiple operations are being performed concurrently, regardless of the actual implementation of the underlying environment. Thus, the invention is useful in multi-tasking, multi-processing and parallel processing environments, as well as in a single-tasking system which operates in a manner that seems like multi-tasking to a user.

BRIEF DESCRIPTION OF THE DRAWINGS

The above and further advantages of the invention may be better understood by referring to the following description in conjunction with the accompanying drawings, in which.

DETAILED DESCRIPTION OF THE DRAWINGS

Figure 1:
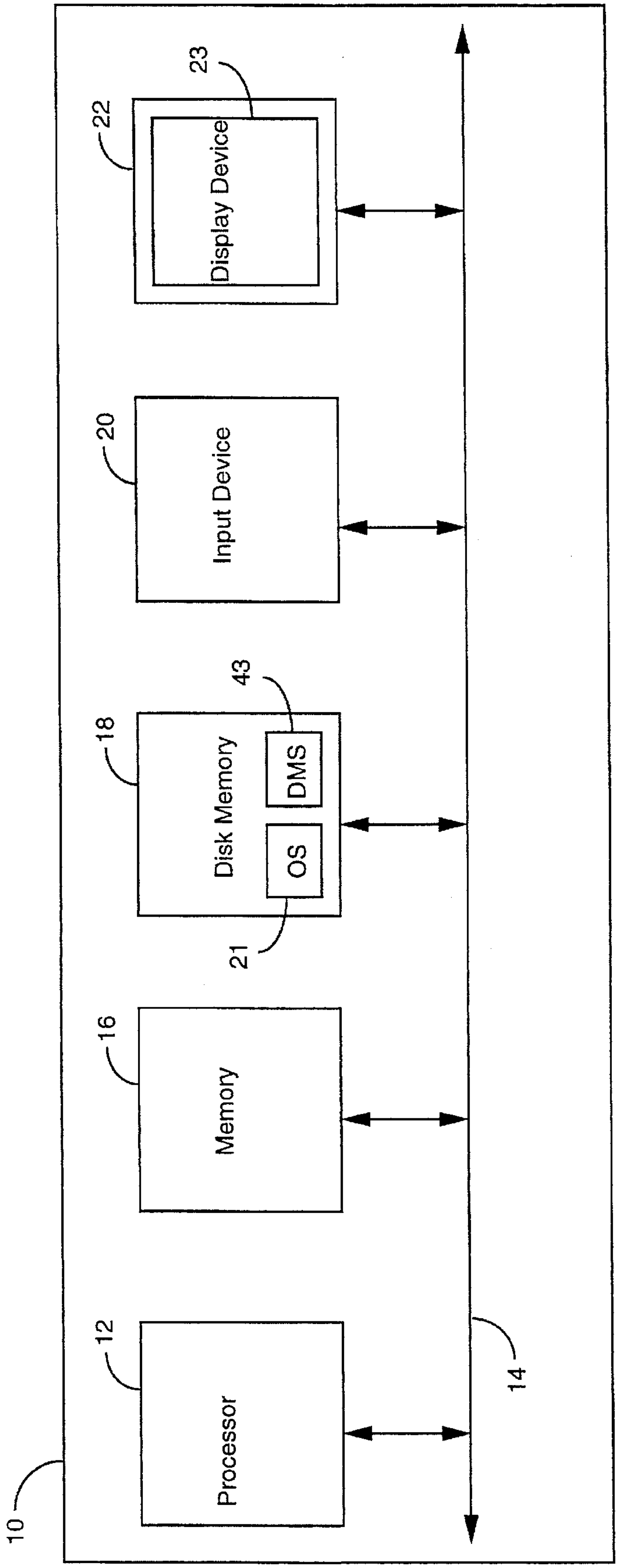
FIG. 1 is a symbolic, simplified block diagram of a system which may incorporate the invention.

FIG. 1 is a block diagram of a computer device 10 which can incorporate the invention. It comprises a processor 12 such as a central processing unit ("CPU") or other microprocessor. A bus 14 interconnects the processor 12 with a memory 16, a disk memory 18, an input device 20 and a display device 22.

The computer device 10 can be any of a personal computer, workstation, minicomputer or large computer, or other specialized computing device capable of executing an operating system or other software with windowing capabilities. The computer device 10 may be connected to other computer devices (not shown) via a network (not shown) such as a local-area network, high-speed bus or other interconnecting mechanism for exchanging messages and data, such as AppleTalk, Ethernet or Token Ring.

The memory 16 is random access memory (RAM). The disk memory 18 is more permanent memory such as a hard disk.

The input device 20 can be a keyboard, mouse, external disk drive or other device capable of receiving input.

The display device 22 can be a monitor or other display device having a screen 24 on which text, graphics or other images can be displayed and viewed.

Numerous types of computer systems may be used, but in the present embodiment, computer software is usually stored on the disk memory 18 and brought into memory 16 over the bus 14 in response to commands issued over bus by the CPU 12. Preferably, the CPU 12 runs an operating system 21 which, possibly together with specialized hardware, supports windowing, i.e. the display and functioning of multiple windows on a display device 22. The operating system 21 is typically stored on disk memory 18 and loaded into memory 16 for execution. Typically, operating systems provide application interfaces for manipulating a window, e.g. opening, closing, moving, and for obtaining information about a window, e.g. location, size. An example of an operating system which may be used is the Apple Macintosh System 7 operating system. For information on Macintosh operating systems, refer to "Inside Macintosh", Vols. I–VI, Addison-Wesley Publishing Co. (1985–1991). "Macintosh" is a registered trademark and "System 7" is a trademark of Apple Computer, Inc.

A desktop management and file management system 43 incorporates the invention. The management system 43 can be part of the operating system or it can be a separate application program which runs on top of the operating system. The management system is typically stored on disk 18 and loaded into memory 16 when a computer is turned on.

Figure 2:
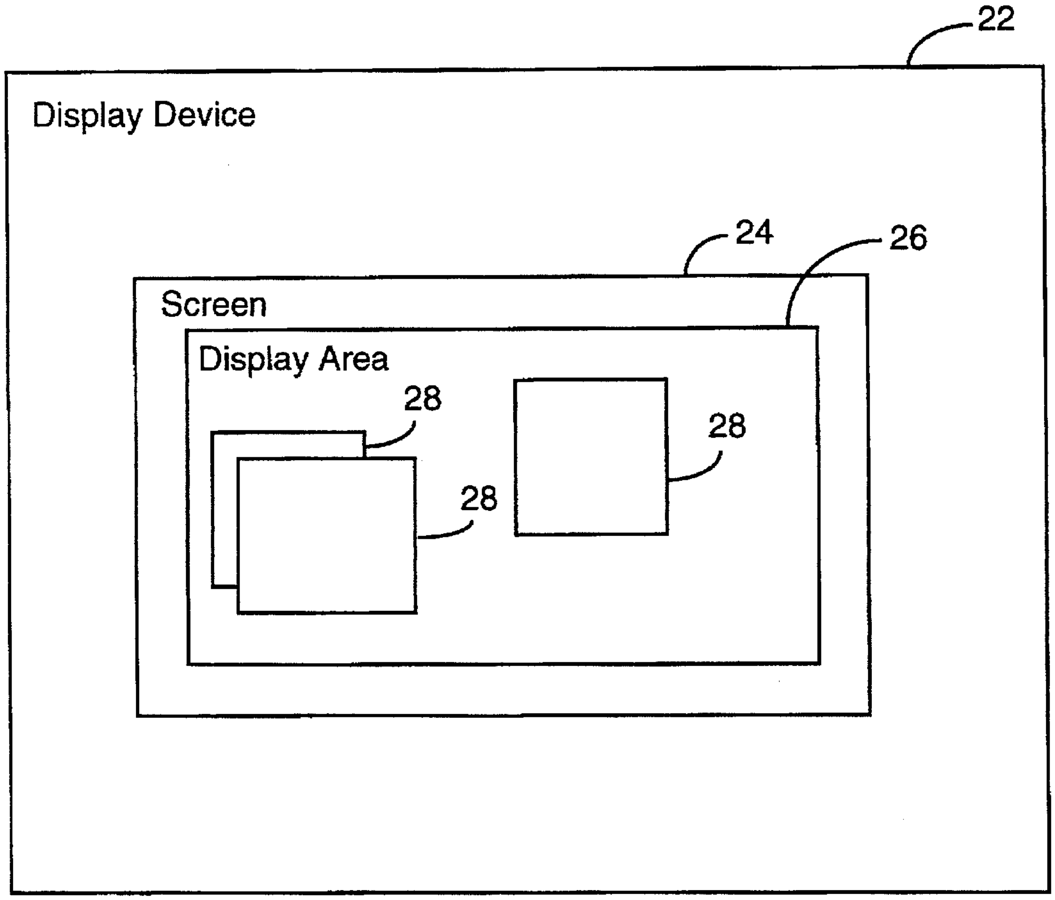
FIG. 2 is a block diagram of a display device of the system of FIG. 1.

FIG. 2 illustrates generally a display device 22 having a screen 24 on which to display text, graphical or other images. The screen 24 includes a display area 26. For purposes of the invention, the display area 26 is the area on the screen on which windows 28 are displayed according to the invention. The display area 26 may cover the entire area of the screen 24 or just a portion thereof. For descriptive purposes the terms display device, screen and display area are hereinafter used interchangeably to mean a portion of the display device upon which windows can be displayed.

In a management system 43 incorporating the invention, a first data structure, herein called a "window slot", specifies directly or indirectly a location on the display device. The window slot also explicitly or implicitly specifies whether the window slot is available or in-use. Typically when a window is opened it is assigned an available window slot, if one exists. When a window slot is assigned to a window it is considered to be in-use. If an available window slot does not exist, then a new window slot is created and assigned to the window. When a window is closed, the corresponding window slot is "deassigned" and made available.

The location information specified by a window slot depends on whether the window slot is in-use or available. If the window slot is in-use, then the window slot typically specifies a location at which the corresponding window was originally displayed. Optionally, the location information specified by the window slot can be updated as the corresponding window is moved to another location on the display device. When a window slot is available, i.e. not in-use, the window slot specifies a location on the display device at which a previously corresponding window was located when that previously corresponding window was closed. Typically, this is a location occupied by the window which was last assigned to the window slot.

Figure 3:
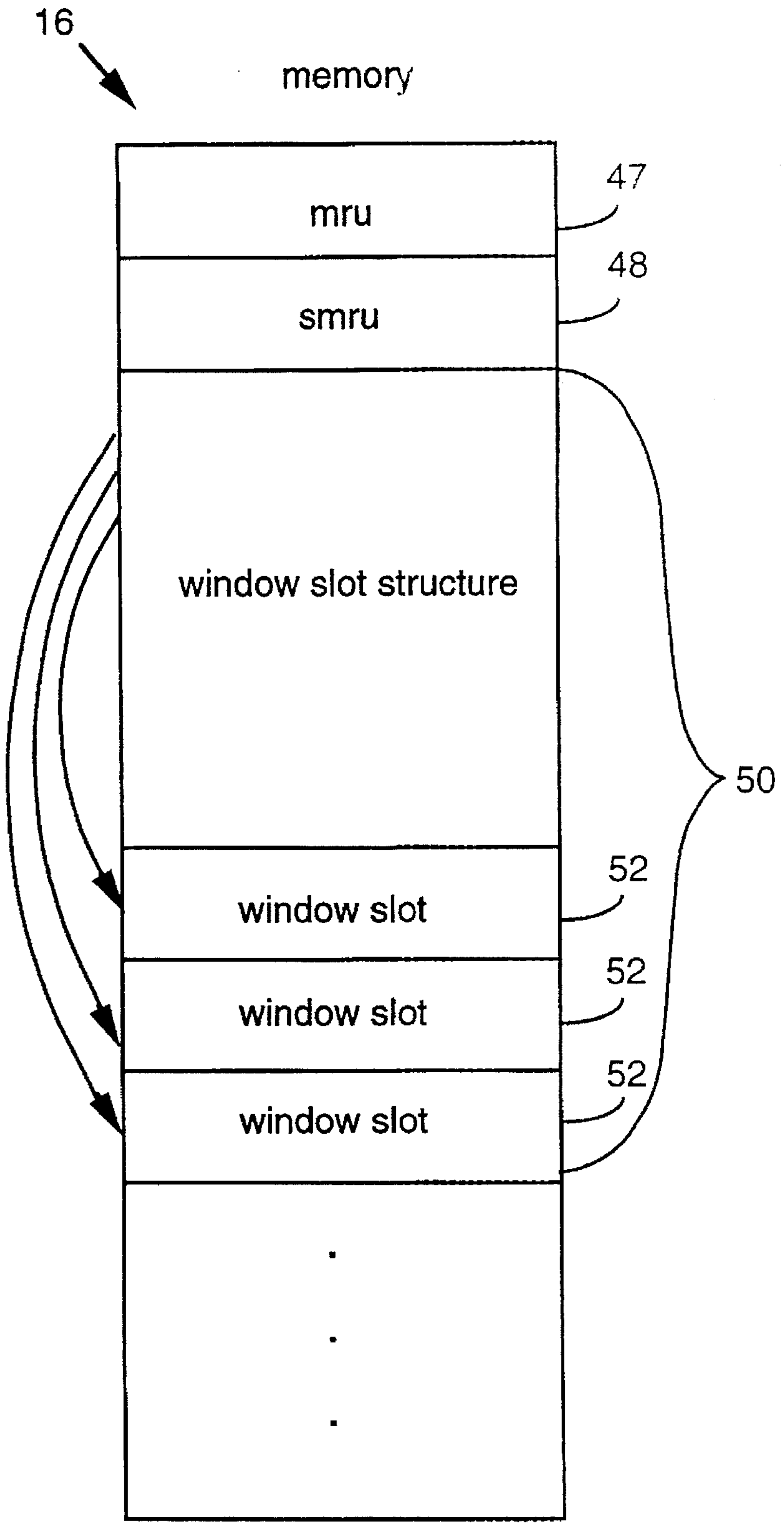
FIG. 3 shows generally contents of a memory of FIG. 1.

Preferably, the system further includes a most-recently-used variable 47 ("mru"), a second-most-recently-used variable 48 ("smru") and at least one window slot structure 50, as shown pictorially in FIG. 3. A window slot structure 50 references one or more window slots 52 either directly or indirectly. Typically, a window slot structure 50 is located in memory 16 or on the disk memory 18 of a computer device 10 (FIG. 1). A window slot structure 50 can be a list or a table, implemented using any appropriate data structure capable of being searched or traversed. For example, a window slot structure 50 can be implemented as an array, a linked list or a double linked list.

The most-recently-used variable 47 specifies the window slot which was most recently assigned to a window. The second-most-recently-used variable 48 indicates which window slot was assigned to a window immediately prior to the assignment of the window slot identified by the most-recently-used variable 47.

Figure 4A:
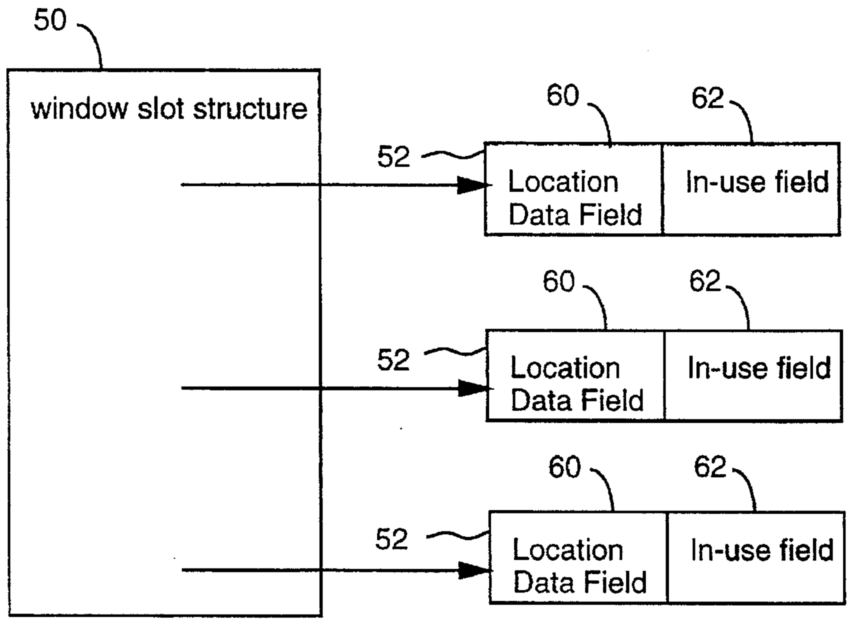
FIGS. 4A and 4B show alternative window slot structures.
Figure 4B:
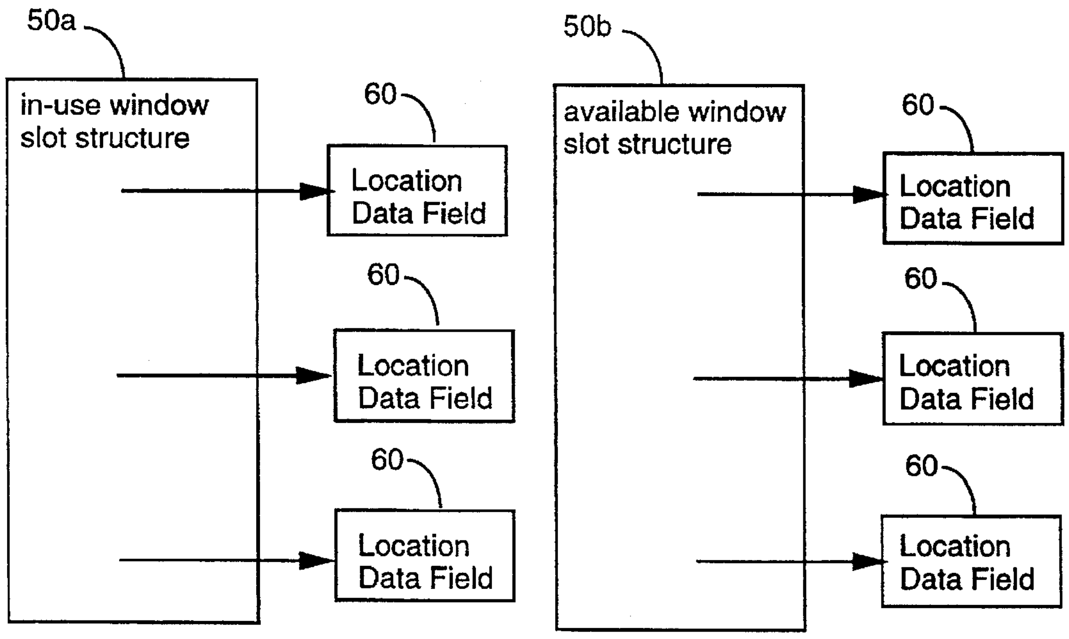

Depending on the configuration of the management system 43, the window slot may specify availability explicitly (FIG. 4A) or implicitly (FIG. 4B). In a first embodiment, as shown pictorially in FIG. 4A, the management system includes a window slot structure which references both available and in-use window slots. In this case, a window slot itself directly or indirectly indicates whether the window slot is available.

The window slot 52 contains at least two fields: a first slot field 60, called a "location data" field, for directly or indirectly specifying a location on the display device and an associated second slot field 62, called an "in-use" field, for specifying whether the window slot is currently "in-use" or available. A window slot is considered to be in-use when that window slot is currently assigned to an open window. The in-use field 62 can be, or can reference, any data structure capable of indicating at least two states: an in-use state and an available state. For example, the in-use field can be a one-bit flag field in which the window is in-use when the in-use field has a value of TRUE.

The location data field 60 specifies a location on the display screen for positioning a particular portion of a window, e.g. the top-left corner of a window. The location data field 60 is comprised preferably of two integers, a first integer representing a horizontal coordinate and a second integer representing a vertical coordinate. The first and second integers can be mapped to an individual pixel or location on the screen.

In an alternative embodiment, as shown pictorially in FIG. 4B, the management system 43 is configured so that the availability of a window slot is determined from the window slots surroundings, rather than directly from the window slot. In this case, the system typically includes two or more window slot structures as described in conjunction with FIG. 3. The example shown in FIG. 4B includes two window slot structures, an in-use window slot structure 50*a* and an available window slot structure 50*b*. The in-use window slot structure 50*a* directly or indirectly references window slots which are currently in-use, while the available window slot structure 50*b* directly or indirectly references window slots which are currently available. Thus, the availability of a window slot can be determined according to the slot structure by which it is referenced.

Figure 5A:
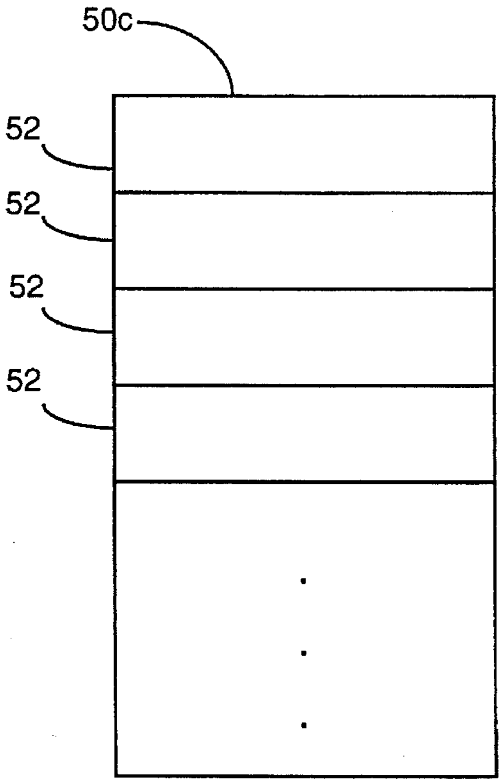
FIGS. 5A and 5B show alternative window identification structures maintained in the memory of the system of FIG. 1.
Figure 5B:
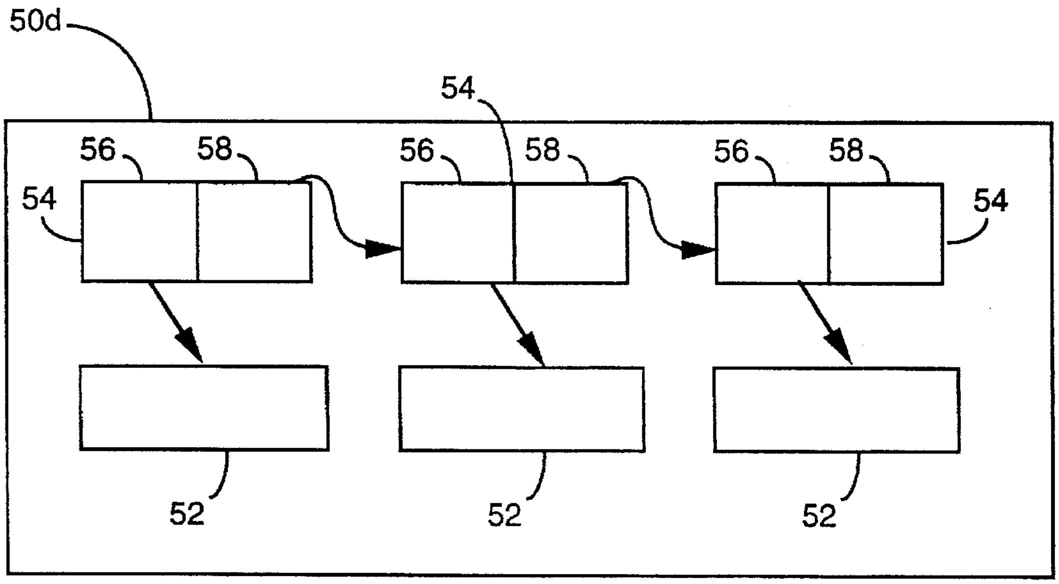

FIGS. 5A and 5B pictorially illustrate various implementations of a window slot structure. FIG. 5A shows a window slot structure 50*c* implemented as a table of window slots, while FIG. 5B illustrates a window slot structure 50*d* implemented as a linked list. The window slot structure 50*c*, shown in FIG. 5A, includes one or more window slots 52, as previously described in conjunction with FIG. 4A.

In FIG. 5B, the window slot structure 50*d* contains one or more structure items 54. Each structure item 54 includes a first structure field 56 and a second structure field 58. The first structure field 56 references a window slot 52 and the second structure field 58 references the next structure item 54 in the window slot structure 50*d*. The end of the window slot structure can be denoted and recognized using any conventional method. For example, a structure item 54 having a first structure field specifying a value that indicates the end of the list can be positioned at the end of the list. A traversal through the list which is not terminated through other means can then terminate upon reaching that end of the list value. Alternatively, a structure item 54 having a first structure field which specifies the number of structure items in the list can be placed at the head of the list.

Preferably, the one or more window slot structures 50 are initialized the very first time a user logs on or a computer system is powered up, depending on the type of computer system, e.g. a single workstation, a network of workstations, a mainframe, or a mini-computer. Moreover, when a computer user logs off or a computer system is powered off, the information in the one or more window slot structures and the referenced window slots is preserved for future use, e.g. stored on the disk 18 (FIG. 1). In a system having multiple users, the information for each user is preserved when the computer system shuts down or is powered off. Then when the user logs on the next time or the computer is restarted, the stored information is reloaded and reused.

The manner in which an empty window slot structure 50 is denoted depends upon the format of the window slot structure 50. If the window slot structure 50 is an array or a linked list having a header which specifies the number of entries in the structure, then the list is initialized by setting the header to specify that there are zero entries in the structure. However, if the window slot structure 50 is an array or linked list with an "ender", i.e. a node or element having a value which indicates that it is the last node or element in the structure, then the window slot structure is initialized so that the only entry in the structure is the ender. The manner in which the window slot structure is initialized should be consistent with the manner in which the end of the window slot structure is denoted.

Alternatively, the window slot structure is initialized having one window slot 52. In that initial window slot 52, the location data field 60 is set to a default location such as the upper left of the screen or the center of the screen and the in-use field 62 is set to value indicating that the window slot 52 is not in-use, i.e. not assigned to a window.

The following code segment written in a C++ language, as set forth in "Annotated C++ Reference Manual", Ellis & Stroustrup, Addison-Wesley, 1990, generally illustrates an example of a data structure definition for a window slot structure 50. This code segment could be used on any processor that has a C++compiler that conforms to the standards set forth in the Annotated C++ Reference Manual, previously cited. In this example, the window slot structure 50, called "TWindowList", is implemented using a linked list as shown in FIG. 5B.

```
class TWindowSlot
    {
    Point            fLocation;   //Horizontal and vertical coordinates
    Boolean          FInUse;      //TRUE if slot is in-use
    }
class TWindowList
    {
    T WindowSlot*    fItem;       //Pointer to a window slot
    T WindowList*    fNext;       //Pointer to next item in list
    }
```

Typically, the most-recently-used variable 47 and the second-most-recently-used variable 48 are initialized at or near the time when the window slot structure is initialized. Preferably, the values of these variables are also preserved on disk 18 (FIG. 1) when a user logs off or a computer system is shutdown or powered off. Typically, the variables 47 and 48 each specify a pointer to a window slot 52. However, if the window slot structure 50 is implemented as a table or array then the variables 47 and 48 can each be an integer specifying an index into the table or array. If the variables 47 and 48 are pointers, then typically each is initialized to a nil pointer. If the variables 47 and 48 are integers, then typically each is initialized to a value which is not a valid index into the array or table and which is recognized as an initialized value, e.g. 0 or −1.

Figure 6A:
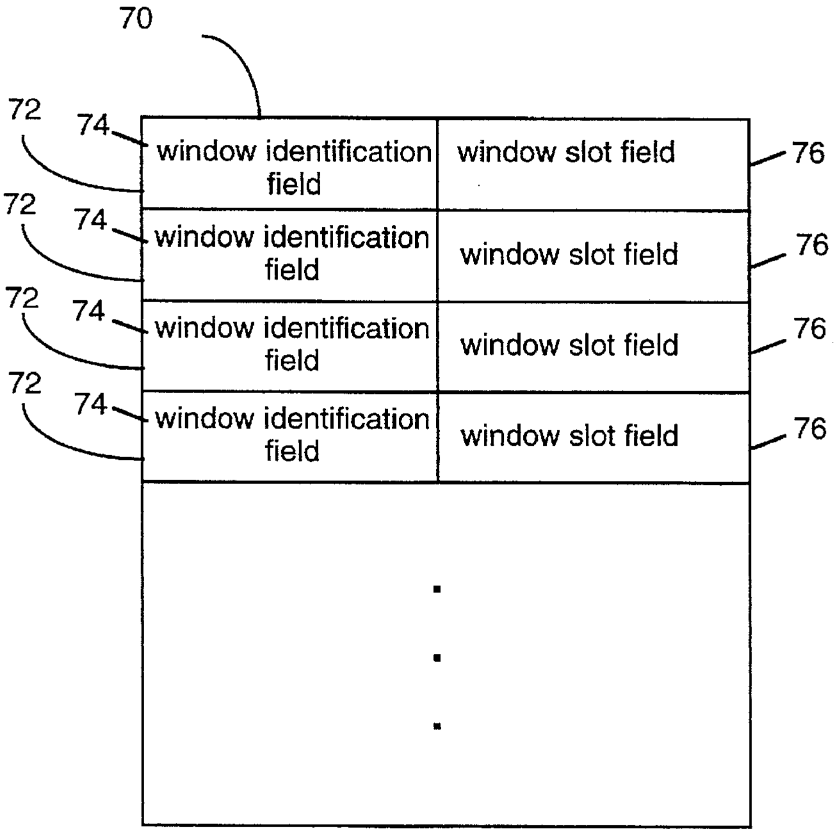
FIGS. 6A and 6B illustrate different implementations of a window identification structure as shown in FIGS. 5A or 5B.
Figure 6B:
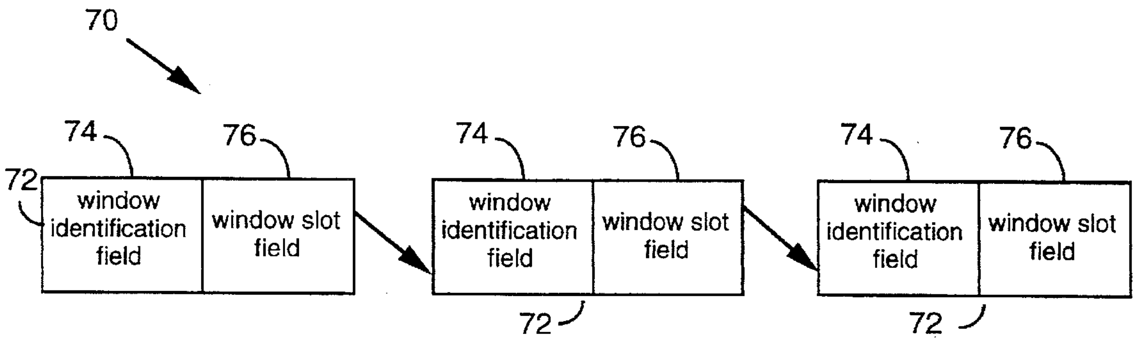

As shown in FIGS. 6A and 6B, typically each process or application which opens or closes one or more windows maintains a data structure or other means for keeping track of the window slot assigned to each window belonging to that process or application. This data structure or other means is herein referred to as a window identification structure 70.

Typically, the window identification structure 70 includes multiple entries 72, each entry having at least a first field 74 and a second field 76. The first field 74, called a "window identification field", specifies a value or identifier, also called a "handle", which uniquely identifies a window. In an entry 72, the second field 76, called a "window slot field", specifies a window slot associated with the window handle identified by the window identification field in that entry.

The window identification structure can be represented by an array/table (FIG. 6A) or a linked list (FIG. 6B). The actual implementation of the window identification structure is not relevant to the invention. Any data structure can be used as long as information of the type specified by the window identification field and the window slot field, described above, can be stored and accessed. The window identification structure is typically located in memory 16 (FIG. 1).

The handle is typically retrieved from an underlying operating system or window management routine which actually creates the window. Preferably, a window handle uniquely identifies a window system-wide across processes, i.e. no other window in the system shown in FIG. 1 has the same handle. Alternatively, a window handle can uniquely identify a window within a process, but not across processes. For example, when a window identification structure 70 is an array, a window handle may be an index into the array. However, this implementation typically includes a data structure for maintaining a relationship between the operating system's identification of the window and the window handle. This relationship is maintained so that the process and the operating system can communicate regarding manipulations of a particular window.

Alternatively, rather than each process retaining a window identification structure, each window retains information about its assigned window slot. For example, the data structure which describes a window and its associated characteristics contains a window slot field for specifying a window slot.

Figure 7:
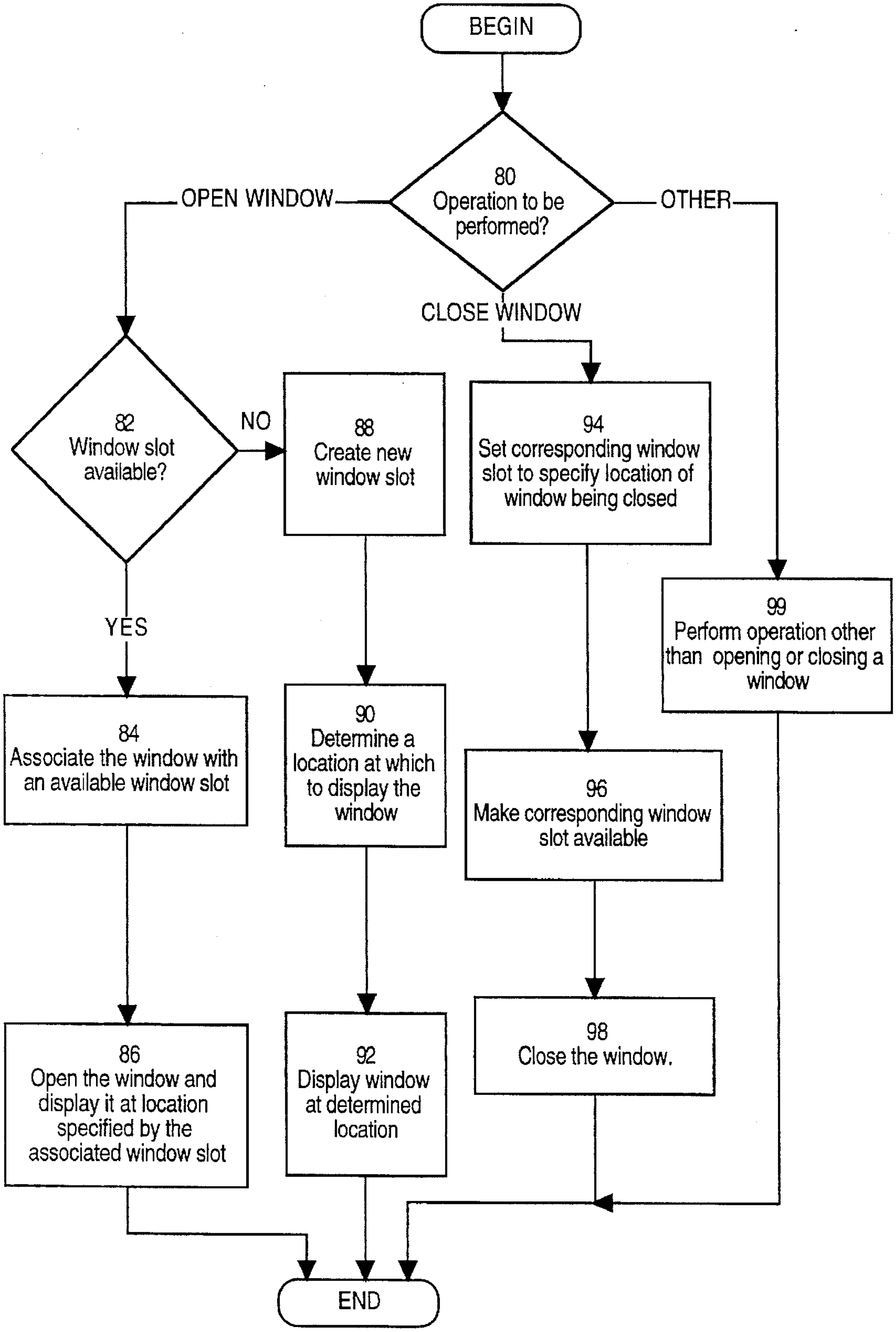
FIG. 7 is a flowchart which generally depicts the steps performed when opening or closing a window in a system of FIG. 1 incorporating the invention.

FIG. 7 describes generally the steps performed in opening or closing a window on a computer system of FIG. 1 embodying the invention. The steps in FIG. 7 are typically performed in response to a request from a user, an application program, a system program, an input or output device, or other mechanism for requesting that an operation be performed upon a window. In a system running Macintosh System 7 with a FINDER, a user can open a window by double-clicking a curser on an icon or by selecting an "open" option off a menu bar. A user can dose a window by clicking a cursor on a specialized "button" in the structure region of the window being closed. This "button" is typically located in the top-left corner of the window. Alternatively, the user can select a "close" or "quit" option off a menu bar.

At decision block 80, it is determined which operation has been requested. If an open window operation was requested, then at decision block 82, it is determined whether an available window slot exists. If an available window slot exists, then at block 84 the window is associated with an available window slot and it is delineated in some manner that the window slot is no longer available. At block 86 the window is opened and displayed on the display device at a location specified by the associated window slot.

If at decision block 82 an available window slot does not exist, then at block 88 a new window slot is created and at block 90 it is determined at which location on the display device to display the window. Then at block 92 the window is displayed at that determined location.

If at derision block 80 a dose window operation was requested, then at block 94 the corresponding window slot is set to specify the location on the display device of the window being closed. Block 94 can be skipped in implementations where the window slot already specifies the location of the corresponding window being closed. For example, in some implementations a window slot is updated whenever the corresponding window is moved to a new location on the display device. In that case, the window slot will already specify the location of the window being closed.

At block 96 the corresponding window slot is made available and at block 98 the window is closed. Blocks 96 and 98 can be performed in any order.

If at derision block 80 an operation other than opening or closing a window was requested, then at block 99 the requested operation is performed.

Figure 8:
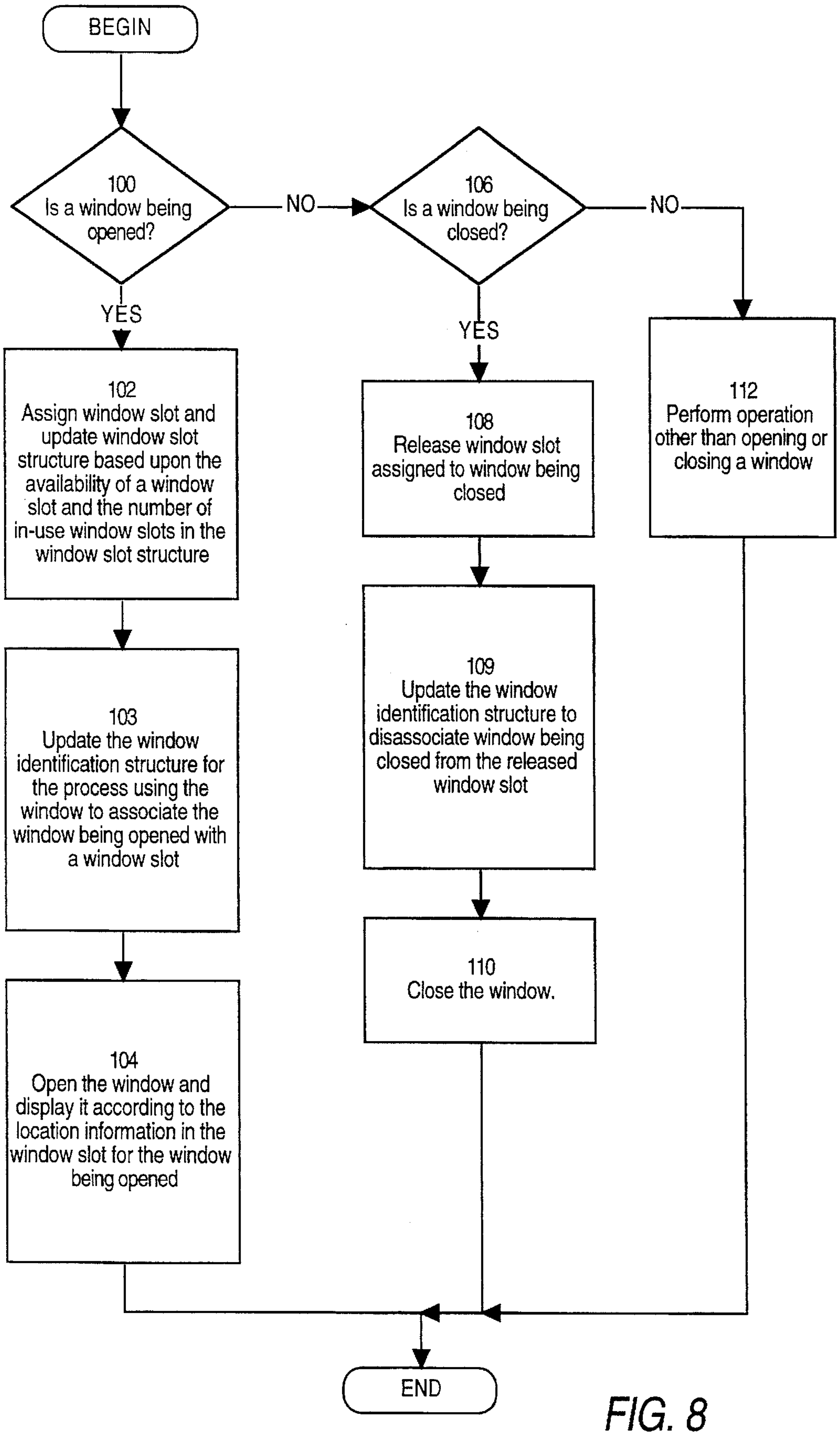
FIG. 8 is a flowchart which more specifically describes the steps performed in opening or closing a window on a system FIG. 1 embodying the invention.

FIG. 8 describes more specifically the steps performed in opening or dosing a window on a system of FIG. 1 embodying the invention. As with FIG. 7, the steps in FIG. 8 are typically performed in response to a request to manipulate a window in some manner. As shown in FIG. 8, if at decision block 100, a window is being opened, then based upon the existence of an available window slot and upon the number of in-use window slots in the window slot structure, at block 102 assign a window slot to the window being opened and update the window slot structure 50 accordingly. Then at block 103, update the window identification structure 70 for the process using the window being opened. Block 103 can be skipped in embodiments of the invention which do not include a window identification structure 70.

The method of updating the window identification structure 70 depends upon the implementation of that identification structure. For example, if it is a linked list, then an element 72 is added to the linked list. The window identification field 74 of that element is set to the window handle of the window being opened and the window slot field 76 is set to reference the window slot assigned at block 102. The actual method used to update the window identification structure 70 is not relevant to the invention as long as the window handle of the window being opened and its assigned window slot are stored and accessible in a manner whereby given a window handle, its assigned window slot can be retrieved and vice versa.

Then at block 104, open the window and display it according to the location information in the assigned window slot 52.

If at decision block 100, a window is not being opened, then if at decision block 106 a window is being closed, then control passes to block 108. At block 108, release the window slot which was assigned to the window being closed. If the embodiment of the invention includes a window identification structure, then the window identification structure 70 for the process which was using the window being closed is used to determine which window slot to release. The window handle of the window being closed is used to lookup the window slot assigned to that window. For example, the window identification structure 70 can be searched for an entry 72 having a window identification field 74 specifying the window handle of the window being closed. If such an entry 72 is found, then the window slot identified by the window slot field 76 of that entry is released; otherwise, an error condition has occurred and can be handled accordingly. Then at block 109 if the embodiment of the invention includes a window identification structure 70, update that structure to disassociate the window being closed from the released window slot. Then at block 110, close the window.

If at derision block 106 a window is not being closed, then perform the operation without reference to the invention. In this case, the operation being performed is unrelated to the invention.

Figure 9:
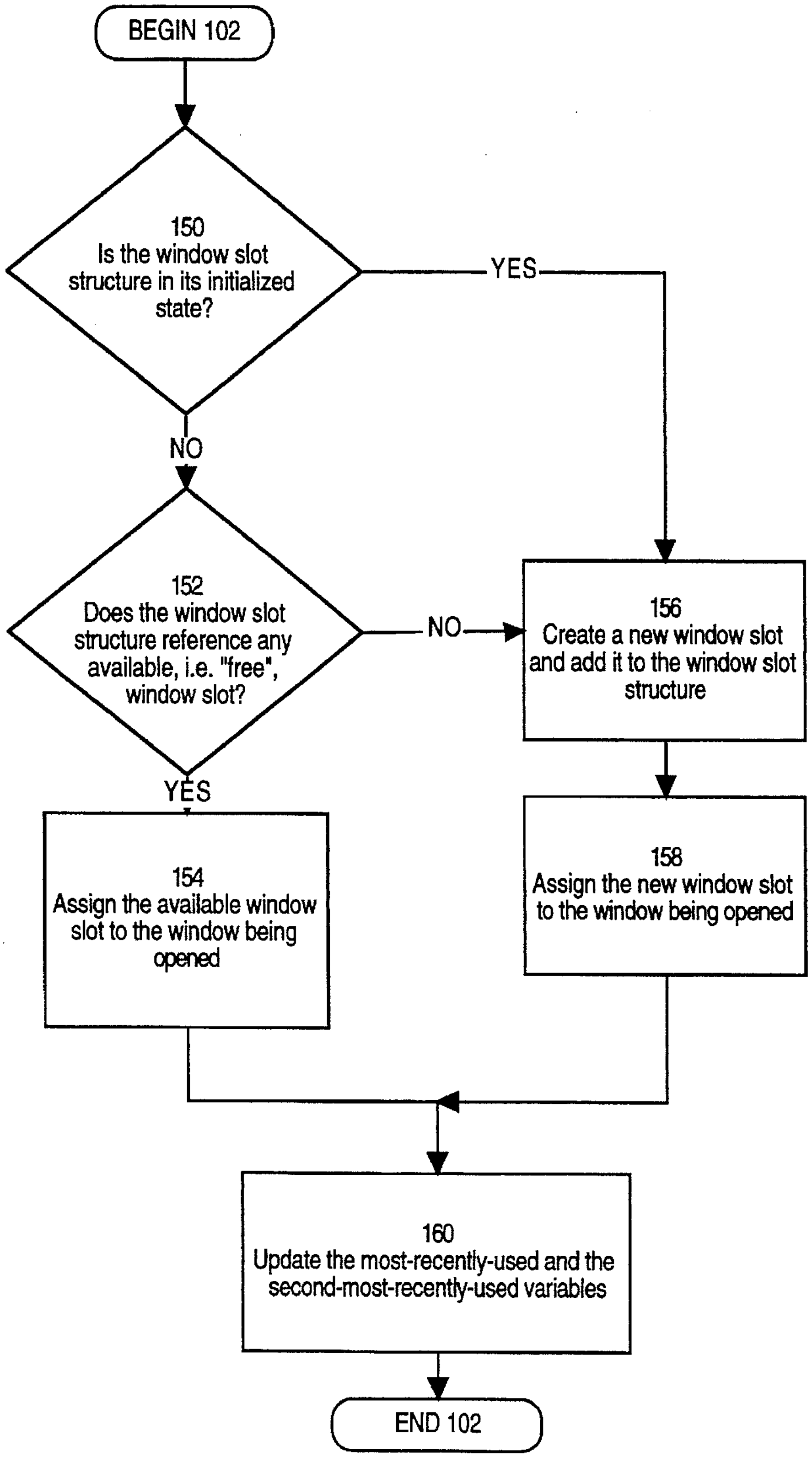
FIG. 9 is a more detailed flowchart of the steps performed at block 102 of FIG. 8.

FIG. 9 depicts in further detail the steps performed at block 102 of FIG. 8. At decision block 152 determine whether at least one of the window slots referenced by the window slot structure is available, e.g not in-use. If there is at least one available window slot, then at block 154, assign an available window slot to the window being opened. In an embodiment of the invention as shown in FIG. 4, the available window slot structure **50*b*** is the structure which is searched for an available window slot.

If at block 152 the window slot structure does not reference at least one free window slot, then control passes to block 154. At block 154, create a new window slot and add it to the window slot structure. Then at block 158, assign the new window slot to the window being opened.

Irregardless of the outcomes of decision block 152, at block 160 update the most-recently-used variable 47 and the second-most-recently-used variable 48. The second-most-recently-used variable 48 is set to the value of the most-recently-used variable 47. The most-recently-used variable 47 is set to reference the window slot assigned to the window being opened.

Figure 10:
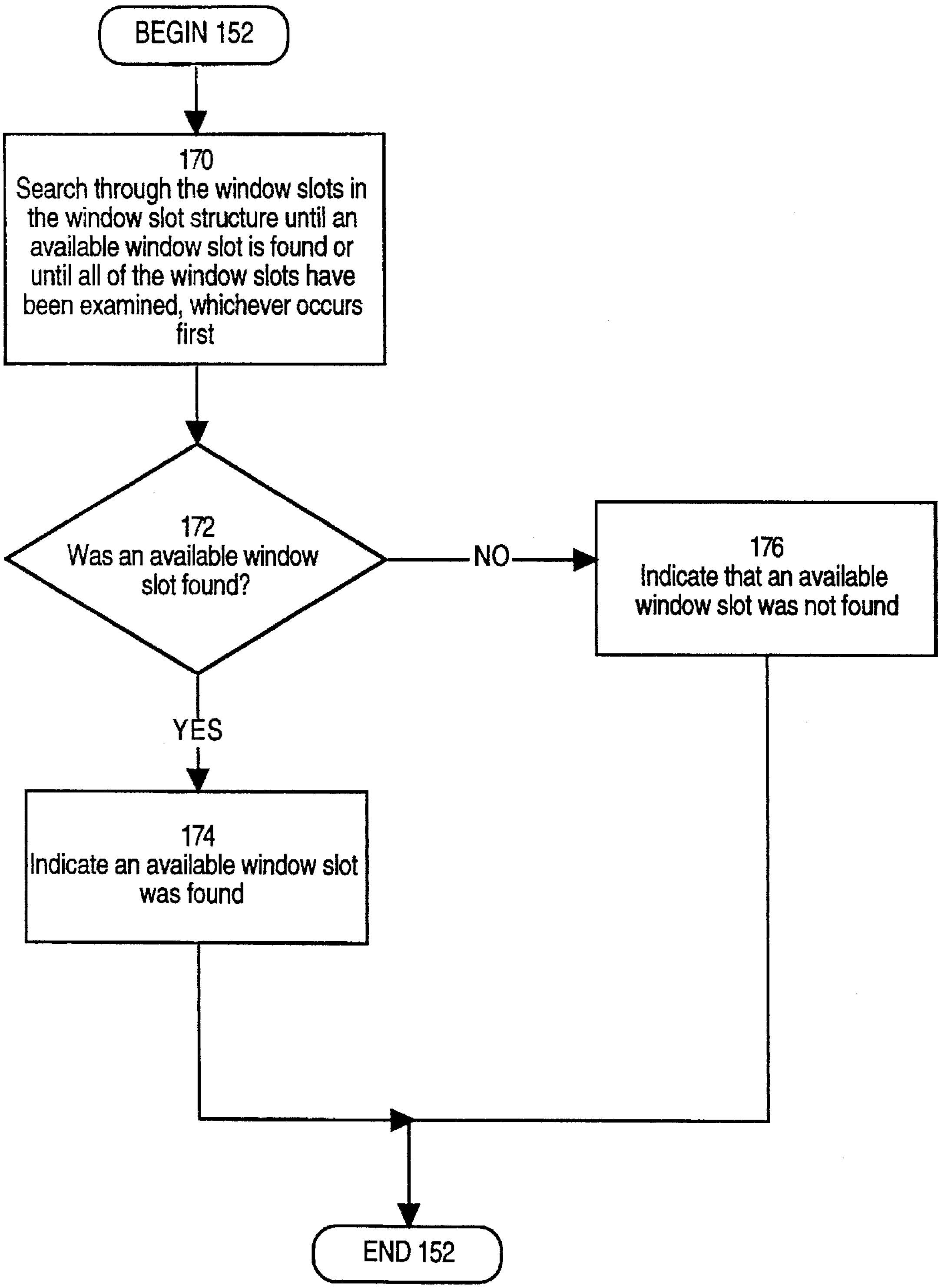
FIG. 10 is a more detailed flowchart of the steps performed at block 152 of FIG. 9.

FIG. 10 illustrates a more detailed embodiment of the steps performed at block 152 of FIG. 9. At block 170 search the window slot list until an available window slot is found or until all of the window slots have been examined, whichever occurs first. The actual mode of searching the window slot list is not important to the invention. Moreover, in a preferred embodiment, the first available window slot is sought. In alternative embodiments, available window slots other than the first one found may be used. In an embodiment of the invention as shown in FIG. 4B the available window slot structure 50*b* is the structure which is searched for an available window slot at block 170.

At derision block 172 if an available window slot was found, then at block 174 indicate that an available window slot was found; otherwise at block 176, indicate that an available window slot was not found. This indication can be direct or indirect and by any means to determine whether to proceed to block 156 or block 154 from block 152 in FIG. 9.

Figure 11:
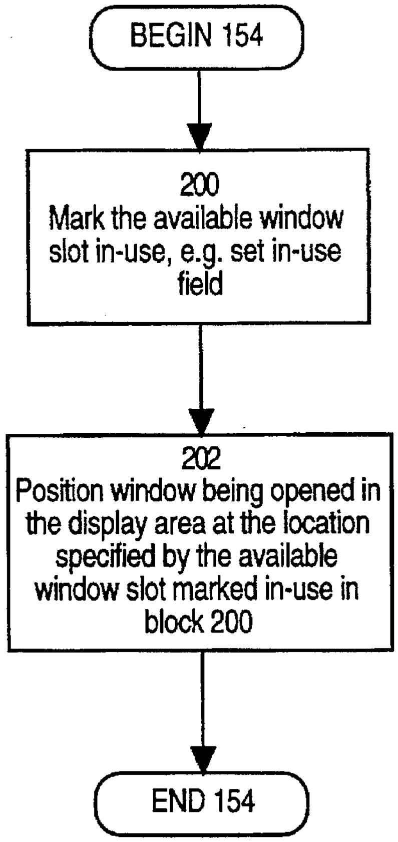
FIG. 11 is a more detailed flowchart of the steps performed at block 154 of FIG. 9.

FIG. 11 illustrates in more detail the steps performed at block 154 of FIG. 9. At block 200 delineate the available window slot as being in-use. In an embodiment of FIG. 4A, this can be accomplished by setting the in-use field to specify that the window slot is in-use. In an embodiment of FIG. 4B, this can be accomplished by having the window slot be referenced by the in-use window slot structure 50*a*, rather than by the available window slot structure 50*b*. At block 202, position the window being opened in the display area at the location specified by the available window slot which was delineated at block 200.

Figure 12:
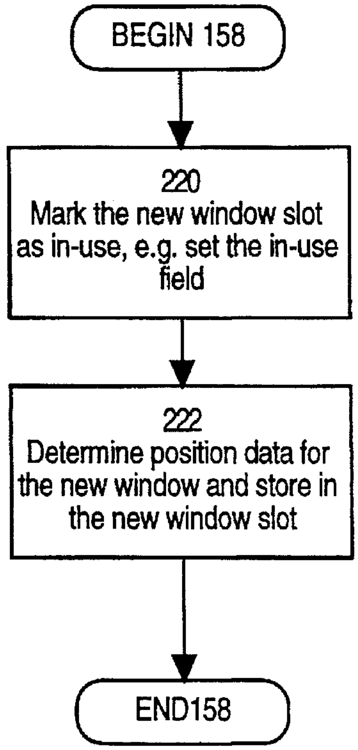
FIG. 12 is a more detailed flowchart of the steps performed at block 158 of FIG. 9.

FIG. 12 depicts in more detail the steps performed at block 158 of FIG. 9. At block 220, delineate the new window slot as being in-use, as previously described in conjunction with FIG. 11. At block 222, determine the position data for the new window and stored in the new window slot. This position data specifies the location on the display area at which to position the new window.

Figure 13:
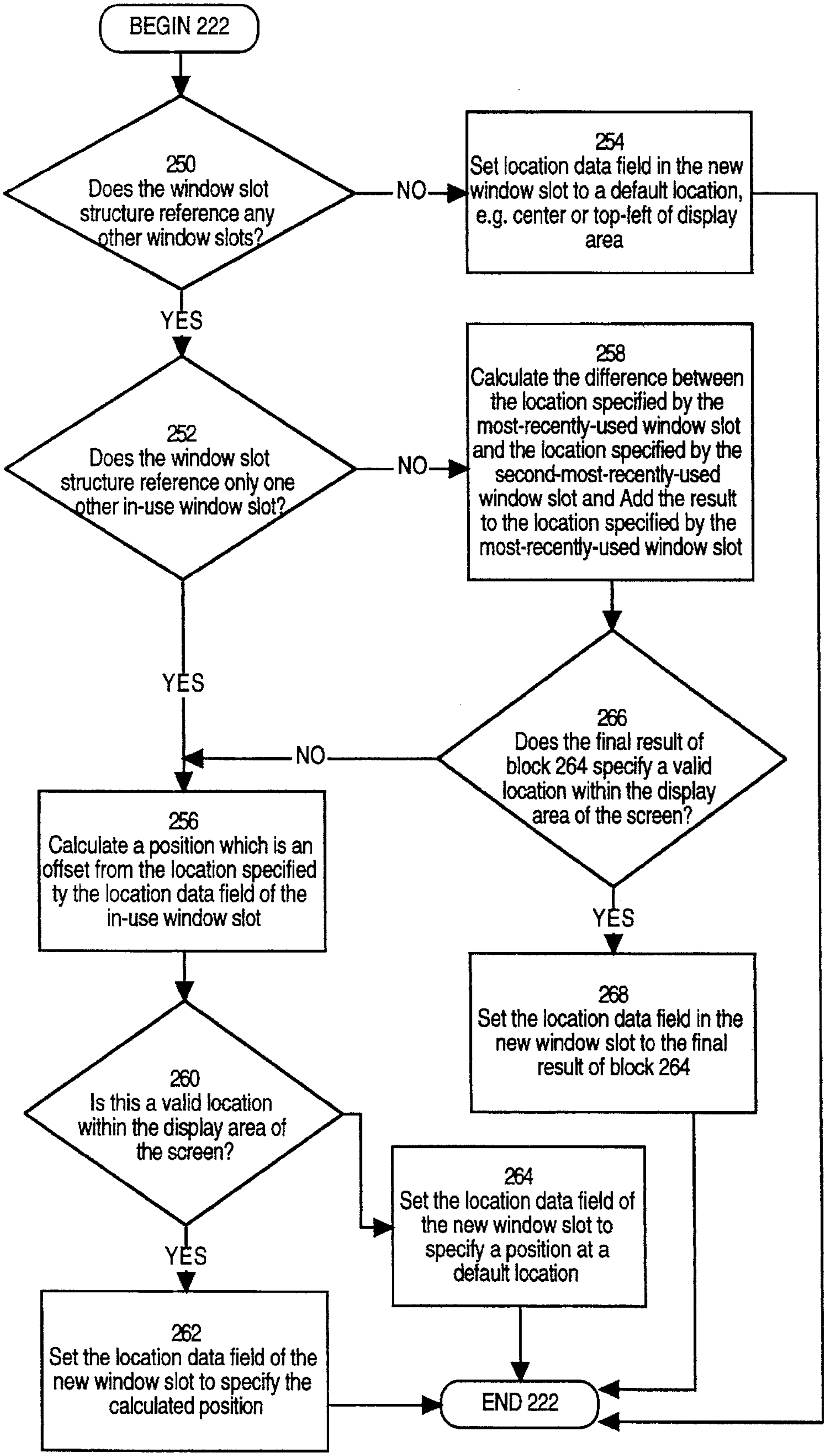
FIG. 13 is a more detailed flowchart of the steps performed at block 222 of FIG. 12.

FIG. 13 shows in more detail the steps performed at block 222 of FIG. 12. At decision block 250, determine whether the window slot structure references any other window slots besides the new window slot created at block 154 of FIG. 9. If there are other window slots, then control passes to decision block 252; otherwise, control passes to block 254.

At decision block 252, determine whether the window slot structure 50 references only one other window slot besides the window slot created at block 154 of FIG. 9 or if it references more than one. If it references only one other window slot, then control passes to block 256; otherwise, control passes to block 258. In an embodiment of the invention as shown in FIG. 4B the available window slot structure 50*b* is the structure which is used in blocks 250 and 252.

At block 256, calculate a position which is at an offset from the location specified by that other window slot, e.g. slightly below and to the right. At decision block 260, determine whether the position calculated at block 256 is a valid location within the display area of the screen. If it is, then at block 262 set the location data field of the new window slot to specify the position calculated at block 256. If it is not a valid location, then at block 264 set the location data field of the new window slot to specify a position at a default location, e.g. the top-left corner of the display area.

If at derision block 280 the window slot structure does not reference any other window slot besides the window slot created at block 154 of FIG. 9, then at block 254 set the location data field in the new window slot to a default location. For example, the default location can be the center of the display area or the top-left corner of the display area.

If at decision block 252, the window slot structure references more than one window slot other than the window slot created at block 154 of FIG. 9, then at block 258 calculate the difference between the location specified by the most-recently-used window slot, i.e. the window slot referenced by the most-recently-used variable 47, and the location specified by the second-most-recently-used window slot, i.e. the window slot referenced by the second-most-recently-used variable 48. Then, add the resulting difference to the location specified by the most-recently-used window slot. The location information is obtained from the location data field of each of the above-referenced window slots.

At derision block 266 determine if the final result obtained at block 264 specifies a valid location within the display area of the screen. If it does, then at block 268 set the location data field in the new window slot to the final result obtained at block 264. If at decision block 266 the final result of block 264 does not specify a valid location, then control passes to block 256 and the steps of blocks 256, 260, 262 and 264 are performed as previously described.

Figure 14:
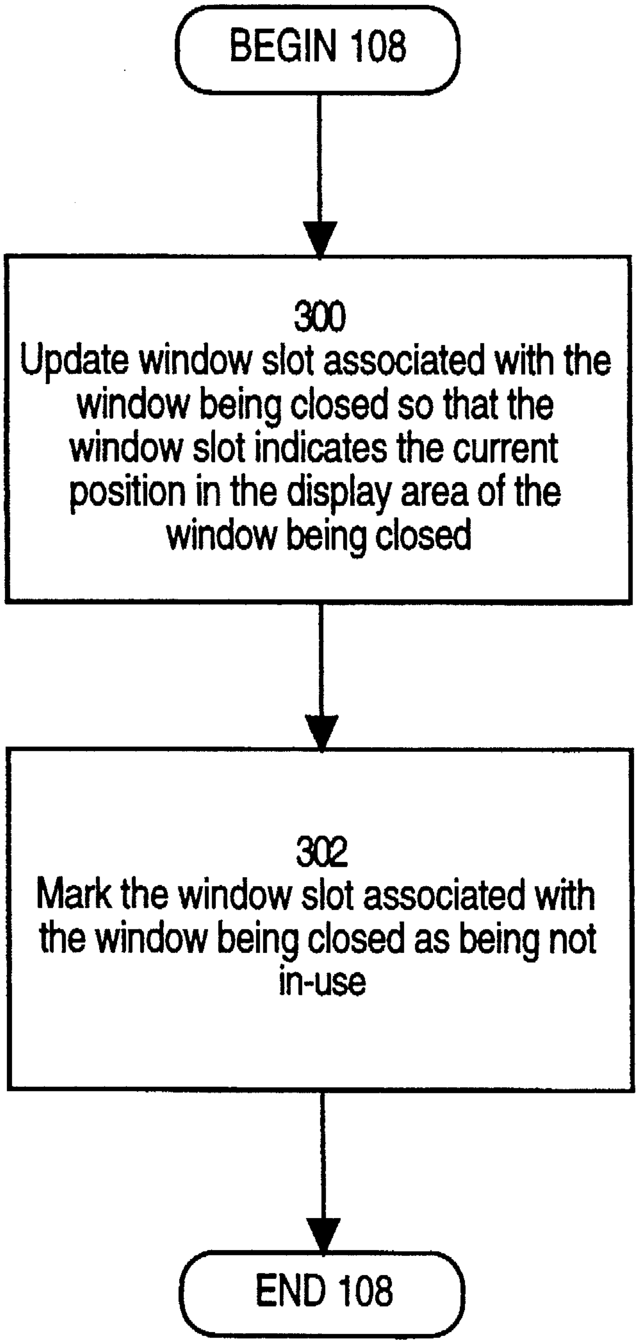
FIG. 14 is a more detailed flowchart of the steps performed at block 108 of FIG. 8.

FIG. 14 is a more detailed depiction of the steps performed at block 108 of FIG. 8. At block 300, update the window slot associated with the window being closed to indicate the position of the window being closed, e.g. set the location data field. Typically, the window handle of the window being closed is used to retrieve the location of the window from the operating system or some other underlying window manager. At block 302, delineate the window slot associated with the window being closed as being not in-use, as described previously in conjunction with FIG. 9. The method used to delineate the window slot as not in-use should be the reverse of the method used to delineate that the window is in use, as described with FIG. 12. For example, if when a window is opened, a window slot is moved from an available window slot structure 50*b* (FIG. 4B) to an in-use window slot structure 50*a*, then when that window is closed, its corresponding window slot is moved back to the available window slot structure. Likewise, if when a window is opened, an in-use field 62 (FIG. 4A) is set to specify that a window slot is in-use, then when that window is closed, the in-use field of the corresponding window slot is set to specify that the window slot is available.

In operation, preferably, the window slot structure, the most-recently-used variable and the second-most-recently-used variable are initialized when a computer is turned on or a user logs on for the first time ever. When a computer system is shutdown or a user logs off, the window slot structures for that user or on that computer system are saved on disk and then reloaded and reused when the user or the computer system is turned back on or logged back on, respectively.

When a request for an open window operation is initiated, the window being opened is assigned an available window slot, if one exists, or a newly-created window slot, if no available window slot exists. If the window is assigned to an existing available window slot, then the window is displayed at the location specified by that window slot. Otherwise, a location at which to display the window is determined according to the number of in-use window slots and the locations of previously-created windows. The determined location is stored in the newly-created window slot and the window is displayed at that location.

At some point, the window slot structure and window identification structure, or other means for keeping track of windows, are updated to reflect the assignment of the window and the window slot. The second-most-recently-used variable is set to the value of the most-recently-used variable and the most-recently-used variable is set to reference either the window slot assigned to the window being opened or the location at which the window was displayed.

When a window is being closed, the window slot assigned to the window being closed is released, e.g. the window slot in the window slot structure is delineated as not being in-use. The window identification structure or other means for keeping track of windows is updated to reflect that the window being closed is no longer associated with the window slot which was released. The window is then closed.

The invention allows a process to display multiple windows concurrently, even if such windows are not associated with a more persistent object such as a disk, folder, or document. Moreover, the invention provides for user or application manipulation of the location of these windows such that the manipulations can affect the location of subsequently displayed windows. Thus, users or applications can indirectly/directly specify preferences for where windows are to be displayed. Moreover, the invention provides a mechanism for approximating a location on the screen which is likely to be desirable and agreeable to a user.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

We claim:

1. A method for positioning windows on a display screen in a computer system in which a user perceives that multiple operations can be executed simultaneously, the computer system having a processor, an input device and a display screen, the processor capable of executing an operating system which supports windowing functionality and a graphical user interface which supports windows, the input device capable of receiving information on the positioning of the windows, said method comprising the steps of:

determining an operation to be performed on a window;

when the operation includes opening the window, determining whether a window slot structure references any available window slots and if it does, then assigning an available window slot to the window being opened, and if it does not, then creating a new window slot, determining a location based on availability of a window slot and the number of unavailable window slots, and setting the new window slot to specify the determined location and assigning the new window slot to the window being opened such that the window slot is in-use; and when the operation includes closing the window, storing in the window slot assigned to the window being closed the location on the display screen of the window being closed such that it can be accessed using the assigned window slot and unassigning the window being closed from the window slot such that the window slot is available.

2. A method as in claim 1 wherein the step of determining whether the window slot structure references any available window slot includes the step of searching the window slots in the window slot structure until an available window slot is found or until all of the window slots have been examined, whichever occurs first.

3. A method for positioning windows on a display screen in a computer system in which a user perceives that multiple operations can be executed simultaneously, the computer system having a processor, an input device and a display screen, the processor capable of executing an operating system which supports windowing functionality and a graphical user interface which supports windows, the input device capable of receiving information on the positioning of the windows, said method comprising the steps of:

determining an operation to be performed on a window;

when the operation includes opening the window, determining whether a window slot structure references any available window slots and if it does, then assigning an available window slot to the window being opened, and if it does not, then (a) creating a new window slot, (b) determining a location by performing the following steps:

(1) determining how many, if any, window slots, other than the newly created window slot, are referenced by the window slot structure;

(2) if the window slot structure does not reference another window slot, then setting the new window slot to specify a default location;

(3) if the window slot structure references only one other window slot then calculating a position which is at an offset from the location specified by the one other window slot and if the calculated position is a valid location on the display screen, then setting the new window slot to specify the calculated position, and if the calculated position is an invalid location on the display screen then setting the new window slot to specify a default position; and (4) if the window slot structure references more than one other window slot, then determining a difference between a location specified by a window slot referenced by a most-recently-used variable and a location specified by a window slot referenced by a second-most-recently-used variable, adding the determined difference to the location specified by the window slot referenced by the most-recently-used variable to compute a result, and if the result is a valid location on the display device then setting the new window slot to specify the result, and if the result is not a valid location on the display device then performing step (3) as if the window slot structure referenced only one other window slot marked as in-use, (c) setting the new window slot to specify the determined location, and (d) assigning the new window slot to the window being opened such that the window slot is in-use; and when the operation includes closing the window, storing in the window slot assigned to the window being closed the location on the display screen of the window being closed such that it can be accessed using the assigned window slot and unassigning the window being closed from the window slot such that the window slot is available.

4. A method as in claim 3 further comprising the step of:

when the operation includes closing a window, updating the second-most-recently-used variable and the most-recently-used variable.

5. A method as in claim 3 wherein the updating step comprises setting the second-most-recently-used variable to specify the location specified by the most-recently-used variable and then setting the most-recently-used variable to specify the location specified by the window being closed.

6. An apparatus for positioning windows on a display screen in a computer system in which a user perceives that multiple operations can be executed simultaneously, said apparatus comprising:

a processor capable of executing an operating system and a graphical user interface, each capable of supporting windows;

a display device for displaying windows;

an input device for manipulating windows on the display device;

a memory;

a system bus interconnecting said processor, said input device, said memory and said display device for exchanging information among them;

means for determining what operation is being performed; and a window slot structure stored in said memory, said window slot structure having zero or more window slots, each window slot specifying a location on the display device and specifying whether the slot is in-use, the location specified by a window slot being based on a location of a previously created window, availability of a window slot and a total number of in-use window slots.

7. An apparatus as defined in claim 6 further comprising:

means for assigning a window slot to a window being opened;

means for updating the window slot structure based upon the availability of a window slot and the number of in-use window slots in the window slot structure; and means for opening a window on the display device.

8. A computer system configured to provide windowing functionality, the functionality including operations of opening a window and closing a window, said computer system comprising:

a processor;

a memory;

a display device having a display screen;

a bus interconnecting said processor, memory and display device;

said memory having stored therein one or more window slots, each window slot being configured to specify a location on said display screen and to specify availability of the window slot, a window slot being unavailable when it is assigned to a particular window; and said processor configured to determine a location at which to display a window on said display screen by (a) determining how many, if any, window slots, other than the newly created window slot, are referenced by the window slot structure;

(b) if the window slot structure does not reference another window slot, then setting the new window slot to specify a default location;

(c) if the window slot structure references only one other window slot then calculating a position which is at an offset from the location specified by the one other window slot and if the calculated position is a valid location on the display screen, then setting the new window slot to specify the calculated position, and if the calculated position is an invalid location on the display screen then setting the new window slot to specify a default position; and (d) if the window slot structure references more than one other window slot, then determining a difference between a location specified by a window slot referenced by a most-recently-used variable and a location specified by a window slot referenced by a second-most-recently-used variable, adding the determined difference to the location specified by the window slot referenced by the most-recently-used variable to compute a result, and if the result is a valid location on the display device then setting the new window slot to specify the result, and if the result is not a valid location on the display device then performing step (c) as if the window slot structure referenced only one other window slot marked as in-use.

9. A method for displaying windows in a computer system configured to provide windowing functionality including operations of creating a window, opening a window and closing a window, the computer system having a processor, a memory, a display device having a display screen, and a bus interconnecting the processor, memory and display device, said memory configured to store therein one or more window slots, each window slot configured to store a location and to implicitly or explicitly indicate availability of the window slot, said method comprising the steps of:

when a window is created or opened, (1) determining whether an available window slot exists in said memory, (2) if an available window slot exists, then assigning the window to the available window slot, displaying the window on the display screen at a location specified by the available window slot and indicating that the available window slot is in-use, and (3) if an available window slot does not exist, then creating a new window slot, assigning the window to the new window slot, determining a location, the location based upon the number of in-use window slots, setting the new window slot to specify the determined location, displaying the window on the display screen at the determined location and indicating that the available window slot is in-use.

10. A method as defined in claim 9, further comprising the steps of:

when a window is closed, (1) setting the window slot associated with the closing window to a location at which the closing window was last displayed on the display screen, (2) unassigning the closing window from the associated window slot, and (3) indicating that the associated window slot is available.

11. A computer system configured to provide windowing functionality, the functionality including operations of opening a window and closing a window, said computer system comprising:

a processor;

a memory;

a display device having a display screen;

a bus interconnecting said processor, memory and display device;

said memory having stored therein one or more window slots, each window slot being configured to specify a location on said display screen and to specify availability of the window slot, a window slot being unavailable when it is assigned to a particular window; and said processor configured to display a window on said display screen at a location based upon locations of one or more previously-created windows, availability of window slots and a total number of in-use window slots.

12. A computer system as in claim 11 wherein said window slots are stored within a window slot structure, said window slot structure being stored in said memory.

13. A computer system as in claim 11 wherein available window slots are stored within a first window slot structure stored on said memory and unavailable window slots are stored within a second window slot structure stored on said memory.

14. A computer system having a processor, a display device and a memory, said computer system being configured to open, close and display windows, said computer system comprising:

said memory having stored therein one or more window slots, each window slot capable of being associated with an open window and configured to reference a location on the display device;

means for indicating whether a particular window slot is in-use or available;

means for determining if an available window slot exists;

means for assigning an available window slot to a window being displayed;

means for creating a new window slot;

means for determining a location at which to display the window being displayed, said location being based upon availability of a window slot and a total number of in-use window slots; and means for assigning the determined location to the window being displayed.

15. A computer system as defined in claim 14, wherein said assigning means stores the determined location in the window slot assigned to the window being displayed.

16. A computer system as defined in claim 15, further comprising:

means for closing a window;

said setting means causing a window slot assigned to a closing window to specify the location of the closing window on the display screen; and means for unassigning a window slot from a window being closed, thereby causing the unassigned window slot to be available.

17. A computer system as defined in claim 15 wherein the means for assigning a window to a window slot is said memory having stored therein a window identification structure.

18. A computer system as defined in claim 14, wherein the location determining means interacts with said availability determining means such that if an available window slot exists, then the determined location is set to the location indicated in the available window slot, and if an available window slot does not exist, then the determined location is based on the total number of in-use window slots.

19. A method for positioning windows on a display screen in a computer system in which a user perceives that multiple operations can be executed simultaneously, the computer system having a processor and a display screen, the processor capable of executing an operating system which supports windowing functionality and a graphical user interface which supports windows, said method comprising the steps of:

determining an operation to be performed on a window;

creating a window slot when a window is opened and existing window slots are unavailable; and when the operation includes opening the window, determining a location at which to display the opened window on the display screen, the location being based on availability of a window slot and a total number of in-use window slots and displaying the window on the display screen at the determined location.

20. A method as defined in claim 19 further comprising the step of:

when the operation includes closing the window, storing the location on the display screen of the window being closed such that it can be accessed using a window slot.

21. A computer readable medium having stored thereon instructions for causing a computer to perform the following steps:

determining if an available window slot exists;

if an available window slot exists, assigning an available window slot to a window being opened and if an available window slot does not exist, creating a new window slot;

determining a location at which to display the window being displayed, said location being based upon availability of a window slot and a total number of in-use window slots; and assigning the determined location to the window being opened.

22. A computer readable medium as defined in claim 21 wherein if an available window slot exists, then the determined location is set to the location indicated in the available window slot, and if an available window slot does not exist, then the determined location is based on the total number of in-use window slots.

23. A computer readable medium having stored thereon instructions for causing a computer to perform the following steps:

determining an operation to be performed on a window;

when the operation includes opening the window, determining whether an available window slot exists;

if an available window slot exists then displaying the window at the location specified by an available window slot; and if an available window slot does not exist, then creating a window slot and determining a location at which to display the opened window on the display screen, the location being based on availability of a window slot and a total number of in-use window slots and displaying the window on the display screen at the determined location.

24. A computer readable medium as defined in claim 23, wherein if an available window slot exists, the window being opened is assigned to the window slot and if an available window slot does not exist, the window being opened is assigned to the created window slot.

25. A computer readable medium as defined in claim 24 wherein the determined location is stored in the created window slot.

26. A method for positioning windows on a display screen in a computer system, said method comprising the steps of:

determining an operation to be performed on a window;

when the operation includes opening the window, determining whether an available window slot exists;

if an available window slot exists then displaying the window at the location specified by an available window slot; and if an available window slot does not exist, then creating a window slot and determining a location at which to display the opened window on the display screen, the location being based on availability of a window slot and a total number of in-use window slots and displaying the window on the display screen at the determined location.

27. A method as defined in claim 26, wherein if an available window slot exists, the window being opened is assigned to the window slot and if an available window slot does not exist, the window being opened is assigned to the created window slot.

28. A method as defined in claim 27 wherein the determined location is stored in the created window slot.

* * * * *

UNITED STATES PATENT AND TRADEMARK OFFICE

CERTIFICATE OF CORRECTION

PATENT NO. : 5,657,463

DATED : August 12, 1997

INVENTOR(S) : Christopher R. Bingham

It is certified that error appears in the above-identified patent and that said Letters Patent is hereby corrected as shown below:

In the abstract: In line 8 delete "more dam structures," and insert - -more data structures,- -

In the claims:

In claim 5 delete "A method as in claim 3" and insert therefor - - A method as in claim 4 - -.

Signed and Sealed this

Sixteenth Day of March, 1999

*Attest:*

Q. TODD DICKINSON

*Attesting Officer*

*Acting Commissioner of Patents and Trademarks*